R. R. DAIGLE.
SALT AND PEPPER SHAKER.
APPLICATION FILED JULY 26, 1915.
1,186,381.
Patented June 6, 1916.
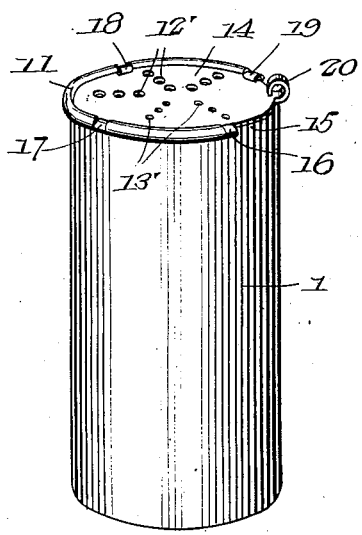
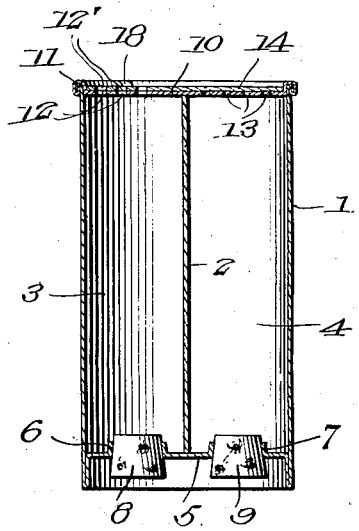
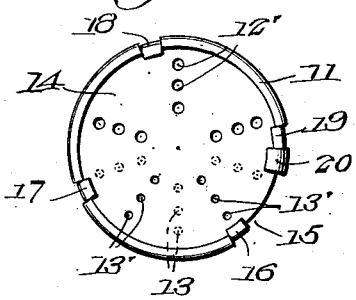
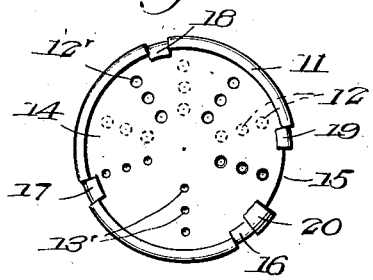
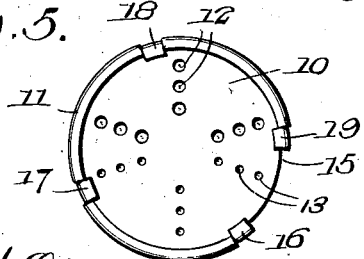
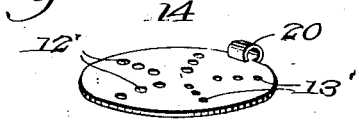
Witnesses
Hugh H. Ott
Inventor
Ralph R. Daigle,
By Victor J. Evans
Attorney

UNITED STATES PATENT OFFICE.

RALPH RAPHAEL DAIGLE, OF MILFORD, MAINE.

SALT AND PEPPER SHAKER.

1,186,381.   Specification of Letters Patent.   Patented June 6, 1916.

Application filed July 26, 1915. Serial No. 42,048.

*To all whom it may concern:*

Be it known that I, RALPH R. DAIGLE, a citizen of the United States, residing at Milford, in the county of Penobscot and State of Maine, have invented new and useful Improvements in Salt and Pepper Shakers, of which the following is a specification.

My invention relates to dispensing vessels for holding both salt and pepper or like condiments, the object of the invention being to provide a receptacle in the form of a shaker having a valve subdividing it into salt and pepper compartments, provided with a discharge perforation at the top thereof, and a rotary disk adjustable to control said perforations, whereby said perforations may be closed or the set of perforations communicating with either of the compartments exposed for the discharge of the contents thereof.

A further object of the invention is to provide a condiment holder of the character described which may be manufactured in a ready, convenient and economical manner.

The invention consists of the features of construction, combination and arrangement of parts herein fully described and claimed, reference being had to the accompanying drawing in which:—

Figure 1 is a perspective view of my improved salt and pepper shaker, showing the valved disk in normal or neutral position. Fig. 2 is a vertical longitudinal section through the device. Figs. 3 and 4 are plan views showing reverse operative positions of the valve disk. Fig. 5 is a view of the upper portion of the receptacle with the valve disk removed. Fig. 6 is a view of the valve disk.

In carrying my invention into practice, I provide a receptacle 1, of cylindrical or other suitable form, and made of glass, metal or other suitable material, metal being preferably employed. This receptacle is divided by a partition 2 into separate and independent compartments 3 and 4, which may respectively, contain salt and pepper or other condiments for dispensation.

The partition 2 terminates above the rim edge of the bottom of the receptacle 1, and extends downward to an elevated bottom wall 5 in which are formed filling openings 6 and 7 closed by stoppers or other suitable closures 8 and 9. Through these openings the compartments 3 and 4 may be conveniently filled and the openings then closed against the escape of the contents.

The receptacle is provided with a top wall 10 which is interlocked with the body of the receptacle, the form of connection being of the usual rim bead 11. This wall is formed with sets of perforations 12 and 13 communicating with the respective openings 3 and 4 and serving as outlets for the discharge of the contained substances therefrom. These openings are governed or controlled by a valve disk 14 having coöperating sets of similarly arranged perforations 12' and 13', said disk being mounted for rotation so as to occupy a neutral or normal position, as shown in Fig. 1 in which both sets of openings 12 and 13 are closed, and reverse discharge positions, as shown in Figs. 3 and 4, respectively, in which the different sets of openings 12 and 13 are open or closed for the discharge or retention of the contents. It will be observed from this that the disk may be adjusted for the discharge of the contents of either compartment, but not for the discharge of both substances at one time.

In order to provide for the retention and rotary mounting of the disk in position without the use of expensive and weakening pivotal connections, the rim portion 11 of the receptacle is cut away to provide a segmental guideway 15 and a series of inwardly bent projections 16, 17, 18 and 19, which projections overhang the disk and hold it in contact with the wall 10 and from displacement. The projections 16 and 19 are also disposed at opposite extremities of the guideway 15 and serve as stops against which a finger piece 20 on the disk is adapted to abut to limit the opening movement of the disk in both directions. It will be evident therefore that when the disk is moved in one direction it will engage the stop and limit the movement of the disk when one of the sets of perforations therein registers with one of the sets of perforations in the wall 10, while when the disk is adjusted in the opposite direction to bring the finger piece in engagement with the stop 19 the other set of perforations in the disk will be brought into registration with the other set of perforations in the wall 10 for the discharge of the contents of the other compartment. The finger piece 20 preferably consists in a portion of material bent inward so as to lie within the plane of the cut-out guideway, the construction thus being such that no portions will project beyond the wall of the receptacle to catch or retain foreign substances or to cause injury to the hand of the operator.

A shaker embodying my invention may obviously be manufactured in a simple and inexpensive manner and used with manifest convenience in dispensing the salt and pepper or other similar substances.

I claim:

A shaker including a cylindrical receptacle body provided with a pair of interior compartments and having an outturned channeled rim edge, a top plate provided with sets of perforations communicating with the respective compartments, said top plate being formed with an upstanding outturned channeled rim embracing and interlocking with the said channeled rim edge of the receptacle body, said rim of the top plate and said rim edge being cut away at points to provide projections offset inwardly and overhanging said top plate in spaced relation thereto, certain of said projections forming stops, a rotary disk mounted upon said perforated top plate for rotary motion beneath said projections and held by said projections from displacement, and a finger piece upon said disk movable in the space between the said stop projections and limited in movement thereby.

In testimony whereof I affix my signature in presence of two witnesses.

RALPH RAPHAEL DAIGLE.

Witnesses:
ALBION OAKES,
HARRY I. BARTLETT.